Figure 1:
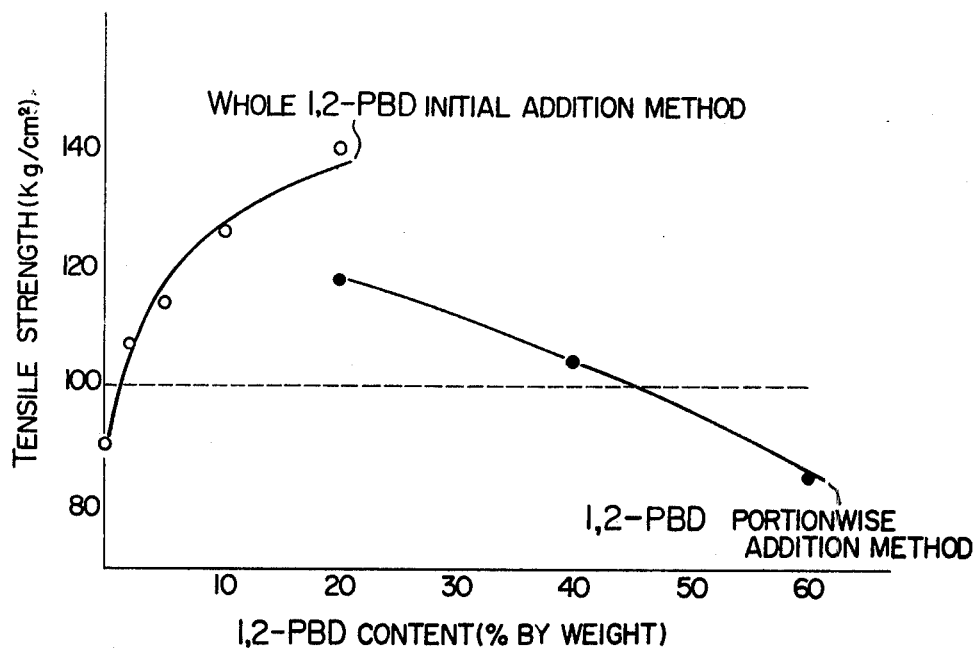

United States Patent [19]

Kimura et al.

[11] 4,108,947
[45] Aug. 22, 1978

[54] THERMOPLASTIC ELASTOMER COMPOSITION

[75] Inventors: Kazuo Kimura; Masao Hirano; Isao Sugita; Ryuzo Fujita, all of Yokkaichi, Japan

[73] Assignee: Japan Synthetic Rubber Co., Ltd., Tokyo, Japan

[21] Appl. No.: 679,973

[22] Filed: Apr. 26, 1976

[30] Foreign Application Priority Data

Apr. 30, 1975 [JP] Japan .................................. 50-51421

[51] Int. Cl.$^2$ ........................ C08L 9/00; C08L 23/00; C08L 47/00
[52] U.S. Cl. .................................. 260/889; 260/852; 260/854
[58] Field of Search ................ 260/889, 851, 852, 854

[56] References Cited

U.S. PATENT DOCUMENTS

| | | | |
|---|---|---|---|
| 3,769,370 | 10/1973 | Martin et al. | 260/889 |
| 3,852,225 | 12/1974 | Ishikawa | 260/889 |

Primary Examiner—J. Ziegler
Attorney, Agent, or Firm—Oblon, Fisher, Spivak, McClelland & Maier

[57] ABSTRACT

A thermoplastic elastomer composition consisting essentially of (A) 2 to 50% by weight of a polybutadiene having a 1,2-addition unit content of 70% or more, (B) 20 to 90% by weight of an olefinic rubber and (C) 5 to 60% by weight of a polyolefin resin, 30 to 95% by weight of the total polymer components, up to 90% by weight of said polybutadiene and up to 90% by weight of said olefinic rubber being soluble in Tetralin when the composition is heated at 210° C for 3 hours in Tetralin under reflux. Said composition is excellent in mechanical strength, weather resistance, oil resistance, heat stability and processability and has a small permanent set.

13 Claims, 2 Drawing Figures

THERMOPLASTIC ELASTOMER COMPOSITION

This invention relates to a thermoplastic elastomer composition excellent in processability and mechanical strength. More particularly, it relates to a thermoplastic elastomer composition composed of a 1,2-polybutadiene, an olefinic rubber such as ethylene-propylene copolymer and a polyolefin resin such as polypropylene in which the constituents are partially crosslinked with a crosslinking agent.

The composition of this invention is thermoplastic, can be molded at a high speed by usual molding processes for thermoplastic resins such as extrusion and injection moldings, and can be reprocessed similarly to other thermoplastic materials. In addition, the composition of this invention has a small permanent set even without being subjected to crosslinking or vulcanization after molding which is required by the conventional elastomers, and are excellent in various characteristics such as tensile strength, weather resistance, oil resistance, heat stability, etc.

As the thermoplastic elastomers, there have hitherto been known block copolymers of aromatic alkenyl compounds, such as styrene, and conjugated diolefins, such as butadiene, isoprene or the like; compositions obtained by grafting polyethylene onto butyl rubber; compositions composed of a polyolefin resin and a partially cured olefinic copolymer rubber such as ethylene-propylene copolymer rubber (EPM) or ethylene-propylene-diene copolymer rubber (EDPM) (see U.S. Pat. No. 3,758,643); and dynamically partially cured thermoplastic blend of monoolefin copolymer rubber and polyolefin plastic (see U.S. Pat No. 3,806,558). This invention provides a composition which is remarkably superior to those hitherto known compositions in processability, permanent set and balance of the abovementioned physical properties.

According to this invention, there is provided a thermoplastic elastomer composition consisting essentially of (A) 2 to 50% by weight of a polybutadiene having a 1,2-addition unit content of 70% or more, (B) 20 to 90% by weight of at least one olefinic rubber and (C) 5 to 60% by weight of a polyolefin resin, 30 to 95% by weight of the total polymer components (namely, the total weight of the above-mentioned components (A), (B) and (C)), up to 90% by weight of said polybutadiene and up to 90% by weight of said olefinic rubber being soluble in Tetralin when the composition is heated at 210° C for 3 hours in Tetralin under reflux.

In the composition of this invention, the polybutadiene having a 1,2-addition unit content of 70% or more with constitutes the (A) component (said polybutadiene being referred to hereinafter as 1,2-polybutadiene) plays a very important role in imparting an excellent balance of various characteristics such as fluidity (namely, processability), permanent set, mechanical strengths, etc. to the composition. The preferable 1,2-addition unit content of the 1,2-polybutadiene is 85% or more. Preferably, the 1,2-polybutadiene of this invention has a crystallinity of 5% or more as measured by the density gradient method disclosed in U.S. Pat. No. 3,864,430. When the crystallinity is less than 5%, the composition will become unsuccessful to hold the necessary tensile strength level. However, when the crystallinity is too high, there is a tendency of the fluidity lowering, so that a crystallinity of 50% or less is preferable. From the viewpoint of balance of physical properties, a 1,2-polybutadiene having a crystallinity of 10 to 30% is particularly preferred.

The 1,2-polybutadiene used in this invention has preferably an intrinsic viscosity $[\eta]$ of about 0.7 dl/g or more (as measured in toluene at 30° C; hereinafter the same applies), because when a 1,2-polybutadiene of too low a molecular weight, such as a liquid 1,2-polybutadiene, is used the composition cannot hold a sufficient strength.

In the composition of this invention, the olefinic rubber constituting the (B) component is a random copolymer composed of at least two aliphatic monoolefins or a combination thereof with at least one polyene. The most typical examples of said olefinic rubber are random ethylene-propylene copolymer (EPM) and random ethylene-propylene-nonconjugated diene copolymers (EPDM), which are most suitably used. Said olefinic rubber may be used either alone or in admixture of two or more.

In the composition of this invention, the polyolefin resins usable as the (C) component include poly-α-olefin resins such as polyethylene, polypropylene, polybutene, polypentene and the like, as well as olefin copolymer resins such as crystalline ethylene-propylene block copolymer and the like. Among them, polyethylene and polypropylene are preferable, and polypropylene is particularly preferred.

The proportions of the components (A), (B) and (C) constituting the composition of this invention are such that the (A) component, 1,2-polybutadiene, is in a proportion of 2 to 50% by weight, preferably 5 to 45% by weight; the (B) component, olefinic rubber, in a proportion of 20 to 90% by weight, preferably 30 to 85% by weight; and the (C) component, polyolefin resin, in a proportion of 5 to 60% by weight, preferably 10 to 40% by weight. If the proportion of component (A) is less than 2%, the composition is poor in mechanical strength and is not improved in permanent set. Therefore, such a proportion cannot be adopted in view of physical property balance. When the proportion of component (A) exceeds 50%, the permanent set and the heat resistance become unsatisfactory. Therefore, such a proportion can neither be adopted. When the proportion of component (B) is less than 20%, the permanent set becomes unsatisfactory and the elasticity decreases. When the proportion of component (B) exceeds 90%, the composition becomes poor in strength. When the proportion of component (C) is less than 5%, the composition is poor in strength. When the proportion of component (C) exceeds 60%, the value of permanent set increases and the flexibility decreases. Therefore, these proportions can neither be adopted.

It is necessary that the composition of this invention is crosslinked partially. Accordingly, the degree of crosslinking is also an important factor in addition to the above-mentioned proportions of the components. The degree of crosslinking of polymers can be indicated by various methods. In this invention, it is indicated by the quantity of soluble fraction (namely, the uncrosslinked fraction) measured by heating the composition at 210° C for 3 hours in Tetralin under reflux. Tetralin is the trade name for 1,2,3,4-tetrahydronaphthalene. The content of each component in the soluble fraction can also be quantitatively determined by preparing a film having a thickness of 0.1 – 0.6 mm from the soluble fraction, obtaining an infrared absorption spectrum of the film, and comparing the absorptions of the components (absorption at 1825 $cm^{-1}$ or 910 $cm^{-1}$ for the 1,2- polybutadiene which is component (A), absorption at 720 cm$^{-1}$ for EPM or EPDM which is a typical example of component (B), and absorption at 840 cm$^{-1}$ for polypropylene which is a typical example of component (C)) with a calibration curve prepared separately.

The degree of crosslinking of the composition of this invention as determined by the above-mentioned method is such that 30 to 95%, preferably 40 to 95%, by weight of the total polymer components (namely, the total of components (A), (B) and (C)) is the soluble fraction of the composition and up to 90% by weight of the (A) component used and up to 90% by weight of the (B) component used are also soluble. If the proportion of the soluble fraction of the total polymer components is less than 30% by weight, namely if the crosslinking of the composition is excessive, the composition is poor in fluidity. If the proportion of the soluble fraction of the total polymer components exceeds 95% by weight, namely if the degree of crosslinking is too low, the composition is insufficient is mechanical strength and exhibits an unsatisfactory permanent set. Therefore, such proportions of the soluble fraction cannot be adopted. If the proportion of the soluble fraction of component (A) exceeds 90% by weight, the composition exhibits an unsatisfactory permanent set and is insufficient in mechanical strength, weather resistance and heat stability. Therefore, such a proportion of the soluble fraction in the (A) component cannot be adopted. If the proportion of the soluble fraction of component (B) exceeds 90% by weight, the composition is insufficient in mechanical strength, such as tensile strength, and in heat stability and, in addition, it exhibits an unsatisfactory permanent set. Therefore, such a proportion of the soluble fraction of the (B) component cannot be adopted.

The above-mentioned partial crosslinking can be realized by treating the mixture of the components with a crosslinking agent. Although the crosslinking agents are not limited to those specifically described herein, radical generators such as organic peroxides are particularly preferable. Examples of said organic peroxides include perioxides and hydroperoxides such as benzoyl peroxide, dicumyl peroxide, di-t-butylperoxide, t-butyl cumyl peroxide, 1,4-bis(t-butylperoxyisopropyl)benzene, diacetyl peroxide, t-butyl peracetate, t-butyl perbenzoate, cyclohexanone peroxide, t-butyl hydroperoxide, bis-2,4-dichlorobenzoyl peroxide, 2,5-bis(t-butylperoxy)-2,5-dimethylhexene, 2,5-dimethyl-2,5-di(t-butylperoxy)hexane and the like.

In this invention, there are also usable other types of crosslinking agents including sulfur; thiazoles such as 2-mercaptobenzothiazole and the like; thiuram disulfides such as N,N'-diethylthiuram disulfide, tetramethylthiuram disulfide and the like; imidazoles such as 2-mercaptoimidazoline and the like; sulfenamides such as cyclohexylbenzothiazole sulfenamide and the like; dithiocarbamates such as zinc dimethyldithiocarbamate and the like; guanidines such as diphenylguanidine and the like; xanthates such as butylxanthic disulfide and the like; aldehyde-amine reaction products such as the reaction products between acetaldehyde and amine, between acetaldehyde and ammonia and the like; substituted ureas such as diethylthiourea, trimethylthiourea and the like; azide compounds such as azide formates, sulfonazides and the like; and so on. These compounds may be used either alone or in admixture of two or more.

The kind and amount of crosslinking agent may be selected appropriately taking into consideration of various conditions including polymer composition, crosslinking method, crosslinking temperature and time, and the like so as to give a composition having the intended degree of crosslinking. Although it is preferable to select a crosslinking agent having an effective activation temperature higher than the softening temperature of the polyolefin resin used, it is also possible to use a crosslinking agent having an effective activation temperature lower than the softening temperature of the polyolefin resin. The crosslinking agent may be used either along or in combination of two or more.

The partial crosslinking is effected by adding a crosslinking agent to the polymers to be crosslinked, while mixing the polymers in such machines as an internal mixer, kneader or extruder. It is preferable to use an appropriate quantity of reaction terminator in order to avoid excess reaction. As the reaction terminator, there may be used compounds known as conventional antioxidant, stabilizer or polymerization inhibitor of amine type, phenol type, sulfide type, phenylaklane type, phosphite type, and the like.

The partially crosslinked composition of this invention can be prepared either by blending the components constituting the composition and then crosslinking the resulting mixture partially or by (partially) crosslinking a mixture of the components and then blending the resulting crosslinked mixture with a quantity of fresh uncrosslinked component or components. It is preferable, however, to blend a part of the (A) component with the (B) and (C) components, partially crosslink the resulting mixture, and thereafter incorporate the residual (A) component into the crosslinked mixture, because the 1,2-polybutadiene, which is the (A) component in the composition of this invention, can more rapidly be crosslinked than the olefinic rubber, which is the (B) component, and the polyolefin resin, which is the (C) component. The latter procedure for preparing the composition is particularly preferable when the proportion of component (A) in the composition is greater than 25%.

The conditions for crosslinking (temperature and period of time) may be selected appropriately in accordance with the polymer composition, the kind and quantity of crosslinking agent, the intended degree of crosslinking, etc. Preferably, the kneading and crosslinking are carried out at a temperature higher than the softening temperature of the polyolefin resin in order to obtain a homogeneous composition.

If necessary, a variety of additives and modifying ingredients, such as fillers, for example, carbon black and the like; extender oils; plasticizers; lubricants; pigments; stabilizers and the like, may be blended with the composition of this invention.

The characteristics of the composition of this invention can widely be varied by varying the proportions of the components and the degree of crosslinking, and hence, the composition can be put to a wide variety of uses, for example, wire coating, gasket, tube, window sealing, hoses, automobile bumper, ball, toy, etc. by processing the composition by extrusion, injection or compression molding, etc.

Figure 2:
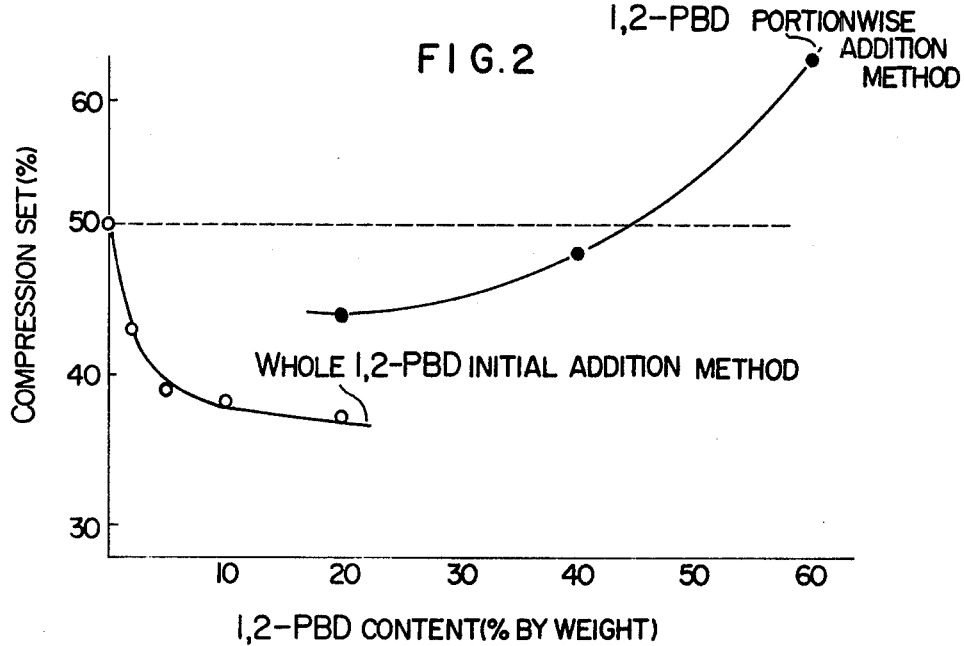

In the accompanying drawings,

FIG. 1 is a graph showing a relation between tensile strength and 1,2-polybutadiene (1,2-PBD) content and FIG. 2 is a graph showing a relation between compression set and 1,2-polybutadiene (1,2-PBD) content.

STANDARDS FOR MEASUREMENTS EMPLOYED IN EXAMPLES

Tensile strength and elongation: JIS K-6301
Hardness: ASTM D 1484
Residual strain at break: ASTM D 412-68
Elongation/residual strain ratio:
  Elongation/residual strain at break x 100 (%)
  (This value was used as an indication of elasticity)
Impact resilience: JIS K-6301
Vicat softening point: ASTM D 648
Oil resistance: JIS K-6301
Weather resistance: ASTM D 750-55 T, Rate of change
Fluidity: measured by use of Koka Model Flow Tester;
Nozzle 1 mm$\phi$ × 2 mm; Preheated for 5 minutes
Tear strength: JIS K-6301, Type B

MATERIALS USED IN EXAMPLES 1,2-PBD-I: 1,2-Addition unit content: 90%
  (measured by infrared spectroscopy)
Crystallinity: 25%
  (measured by density gradient method)
[$\eta$]: 1.25 dl/g
  (measured in toluene at 30° C)
1,2-PBD-II: 1,2-Addition unit content: 90%
Crystallinity: 17.6%
[$\eta$]: 1.26 dl/g
  (measured in toluene at 30° C)
EPDM: Ethylene content: 70% by weight
Propylene content: 28% by weight
Ethylidene-norbornene content: 2% by weight
Mooney viscosity: 70 (ML $_{1+4}^{100°\,C}$)
PP: Crystalline isotactic polypropylene
Specific gravity: 0.898
Melt flow index: 10.5 g/10 minutes (ASTM D 1238)
PO-I: Dicumyl peroxide, 40% purity grade
  (trade name: Percumyl D40, manufactured by Nihon Yushi)
PO-II: 2,5-Dimethyl-2,5-di-(t-butylperoxy)hexane, 40% purity grade
  (trade name: Perhexa 25B40, manufactured by Nihon Yushi)
PO-III: 1,4-Bis(t-butylperoxyisopropyl)benzene, 40% purity grade
  (trade name: Peroxymon F40, manufactured by Nihon Yushi)
SS: 2,6-Di-t-butyl-p-cresol
CB: Carbon black
  (trade name: Sho-black O, manufactured by Showa Denko)
OIL: Naphthenic oil

EXAMPLES 1 – 5 AND COMPARATIVE EXAMPLES 1 – 5

The compositions shown in Tables 1 and 2 were prepared by the following procedure.

On an open roll preliminarily adjusted to a temperature of 180° C, the whole quantities (predetermined) of EPDM and PP were mixed uniformly with a part of 1,2-PBD-I or II for about 5 minutes. Subsequently, a predetermined quantity of PO-I or II was added and the resulting mixture was kneaded for an additional about 5 minutes. Subsequently, a predetermined quantity of SS was added and the resulting mixture was kneaded for about one minute. Then, the residual 1,2-PBD-I or II was added and the resulting mixture was kneaded for about 5 minutes to give an intended composition. Thereafter, the composition was pressed for about 5 minutes with a hot press kept at 180° and cooled rapidly, after which it was used as specimens for the various tests.

From the data in Tables 1 and 2, it can be seen that as compared with the uncrosslinked blend, the composition of this invention was greatly improved in strength, permanent set, heat stability, weather resistance and oil resistance because the tensile strength and Vicat softening point were remarkably enhanced, the compression set was small, and the rate of change in resistance to weather and oil was also small.

Table 1

| | | Example 1 | Example 2 | Example 3 | Comparative Example 1 | Comparative Example 2 | Comparative Example 3 |
|---|---|---|---|---|---|---|---|
| 1,2-PBD-I | (% by weight) | 33.4 | 16.8 | 25 | 33.4 | 16.8 | 25 |
| EPDM | (% by weight) | 33.3 | 41.6 | 37.5 | 33.3 | 41.6 | 37.5 |
| PP | (% by weight) | 33.3 | 41.6 | 37.5 | 33.3 | 41.6 | 37.5 |
| PO-I | (PHR) | 1.5 | 1.5 | 1.5 | 0 | 0 | 0 |
| SS | (PHR) | 1.0 | 1.0 | 1.0 | 0 | 0 | 0 |
| Tetralin-soluble fraction | (% by weight) | 50 | 51 | 51 | 100 | 100 | 100 |
| proportions of Tetralin soluble fractions | | | | | | | |
| 1,2-PBD-I | (% by weight) | 46 | 50 | 54 | 100 | 100 | 100 |
| EPDM | (% by weight) | 32 | 20 | 47 | 100 | 100 | 100 |
| PP | (% by weight) | 72 | 83 | 77 | 100 | 100 | 100 |
| Tensile strength (kg/cm$^2$) | | 141 | 131 | 135 | 80 | 96 | 101 |
| Elongation (%) | | 150 | 290 | 150 | 110 | 50 | 70 |
| Hardness (Shore D) | | 56 | 56 | 56 | 56 | 57 | 57 |
| Residual strain at break (%) | | 25 | 69 | 29 | 30 | 12 | 18 |
| Elongation/residual strain ratio | | 6.0 | 4.2 | 5.2 | 3.7 | 4.1 | 3.9 |
| Impact resilience (%) | | 45 | 48 | 48 | 44 | 46 | 45 |
| Compression set (%) | | | | | | | |
| 25° C × 22 hrs. | | 43 | 48 | 46 | 49 | 60 | 52 |
| 70° C × 22 hrs. | | 61 | 66 | 63 | 89 | 91 | 90 |
| Vicat softening point (° C) | | 104 | 123 | 113 | 76 | 90.5 | 87 |
| Oil resistance (Immersed in JIS No. 3 oil) | | | | | | | |
| Change in weight (%) | | | | | | | |
| 48 hrs. | | 29 | 32 | 28 | 44 | 51 | 48 |
| 96 hrs. | | 43 | 51 | 47 | 66 | 72 | 69 |
| Change in volume (%) | | | | | | | |
| 48 hrs. | | 28 | 31 | 27 | 43 | 50 | 47 |
| 96 hrs. | | 42 | 49 | 45 | 64 | 71 | 68 |

Table 1-continued

|  | Example | | | Comparative Example | | |
|---|---|---|---|---|---|---|
|  | 1 | 2 | 3 | 1 | 2 | 3 |
| Weather resistance (percentage change after 96 hrs.) | | | | | | |
| Tensile strength | 5 | 2 | 4 | −11 | −4 | −6 |
| Elongation | −30 | −25 | −33 | −78 | −36 | −51 |

Note: PHR means parts by weight per hundred parts by weight of the total of 1,2-PBD, EPDM and PP.

Table 2

|  |  | Example | | Comparative Example | |
|---|---|---|---|---|---|
|  |  | 4 | 5 | 4 | 5 |
| 1,2-PBD-II | (% by weight) | 25 | 41.6 | 25 | 41.6 |
| EPDM | (% by weight) | 50 | 41.6 | 50 | 41.6 |
| PP | (% by weight) | 25 | 16.8 | 25 | 16.8 |
| PO-II | (PHR) | 1.5 | 1.5 | 0 | 0 |
| SS | (PHR) | 1.0 | 1.0 | 0 | 0 |
| Tetralin-soluble fraction | (% by weight) | 44 | 65 | 100 | 100 |
| Proportions of Tetralin-soluble fractions | | | | | |
| 1,2-PBD-II | (% by weight) | 49 | 31 | 100 | 100 |
| EPDM | (% by weight) | 19 | 30 | 100 | 100 |
| PP | (% by weight) | 90 | 89 | 100 | 100 |
| Tensile strength (kg/cm$^2$) | | 126 | 69 | 65 | 66 |
| Elongation (%) | | 240 | 230 | 60 | 80 |
| Hardness (Shore D) | | 48 | 43 | 47 | 43 |
| Residual strain at break (%) | | 28 | 27 | 15 | 10 |
| Elongation/residual strain ratio | | 8.6 | 8.5 | 4.0 | 8.0 |
| Impact resilience (%) | | 48 | 47 | 43 | 39 |
| Compression set (%) | | | | | |
| 25° C × 22 hrs. | | 43 | 41 | 51 | 50 |
| 70° C × 22 hrs. | | 50 | 58 | 88 | 88 |
| Vicat softening point (° C) | | 77 | 55 | 52 | 49 |
| Oil resistance (immersed in JIS No. 3 oil) | | | | | |
| Change in weight (%) | | | | | |
| 48 hrs. | | 81 | 60 | 103 | 82 |
| 96 hrs. | | 119 | 81 | 134 | 127 |
| Change in volume (%) | | | | | |
| 48 hrs. | | 79 | 58 | 102 | 81 |
| 96 hrs. | | 116 | 79 | 132 | 126 |
| Weather resistance (percentage change after 96 hrs.) | | | | | |
| Tensile strength | | 3 | 3 | −3 | −8 |
| Elongation | | −34 | −33 | −40 | −52 |

Note: PHR means parts by weight per hundred parts by weight of the total of 1,2-PBD, EPDM and PP.

EXAMPLES 6 - 9 AND COMPARATIVE EXAMPLES 6 - 7

The compositions shown in Table 3 were prepared by the following procedure.

In a B type Banbury mixer preliminarily heated to a temperature of about 100° C, the whole quantities of all the components listed in Table 3 were blended. As the blending proceeded, the heat generation by the polymers during mixing caused temperature rising, whereby the PP commenced to melt. After the PP had completely melted, PO was added. The PO was allowed to react with the components for several minutes, after which the reaction was stopped by adding SS. This procedure is referred to hereinafter as "whole 1,2-PBD initial addition method." The resulting mixture was passed through an open roll to obtain a sheet, which was pelletized by means of a sheet pelletizer.

Specimens for use in compression permanent set test were prepared by pressing the pellets with a hot press at 180° C for about 5 minutes and then cooling them rapidly. Other specimens were prepared by molding the pellets into the dampbell by means of 1 oz. injection machine.

The composition of Comparative Example 6 which contained no 1,2-PBD was unsatisfactory in balance of physical properties because it was poor in tensile strength and exhibited an unsatisfactory compression set. When a larger quantity of 1,2-PBD was used there was obtained a composition having an extraordinarily large gel content (namely, Tetralin-insoluble fraction content) (Comparative Example 7). It was poor in fluidity, so that it could not be molded into test pieces. It was undesirable, so far as a thermoplastic elastomer was intended.

Table 3

|  |  | Example | | | | Comparative Example | |
|---|---|---|---|---|---|---|---|
|  |  | 6 | 7 | 8 | 9 | 6 | 7 |
| 1,2-PBD-I | (% by weight) | 2 | 5 | 10 | 20 | 0 | 40 |
| EPDM | (% by weight) | 68.6 | 66.5 | 63 | 56 | 70 | 42 |
| PP | (% by weight) | 29.4 | 28.5 | 27 | 24 | 30 | 18 |
| PO-III | (PHR) | 1.5 | 1.5 | 1.5 | 1.5 | 1.5 | 1.5 |
| SS | (PHR) | 1.0 | 1.0 | 1.0 | 1.0 | 1.0 | 1.0 |
| Tetralin-soluble fraction | (% by weight) | 83 | 82 | 80 | 64 | 64 | 28 |
| Proportions of Tetralin- | | | | | | | |

Table 3-continued

|  |  | Example | | | | Comparative Example | |
|---|---|---|---|---|---|---|---|
|  |  | 6 | 7 | 8 | 9 | 6 | 7 |
| soluble fractions |  |  |  |  |  |  |  |
| 1,2-PBD-I | (% by weight) | 70 | 75 | 67 | 51 | — | 10 |
| EPDM | (% by weight) | 77 | 78 | 77 | 58 | 56 | 19 |
| PP | (% by weight) | 97 | 94 | 93 | 90 | 90 | 86 |
| Fluidity (cc/sec) × $10^3$ |  |  |  |  |  |  |  |
| Under 30 kg load at 180° C |  | 11.30 | 9.80 | 4.95 | 2.00 | 9.20 | 0 |
| Under 30 kg load at 200° C |  | 18.0 | 14.3 | 6.75 | 3.25 | 13.1 | 0 |
| Tensile strength (kg/cm$^2$) |  | 106 | 114 | 126 | 140 | 90 | Unmoldable |
| Elongation (%) |  | 400 | 340 | 250 | 150 | 360 | " |
| Hardness (Shore D) |  | 39 | 41 | 41 | 43 | 36 | " |
| Permanent elongation (%) |  | 23 | 22 | 24 | 26 | 24 | " |
| Compression set, 70° C × 22 hours (%) |  | 43 | 39 | 38 | 37 | 50 | " |

Note: PHR means parts by weight per hundred parts by weight of the total of 1,2-PBD, EPDM and PP, provided in Comparative Example 6, it means parts by weight per hundred parts by weight of the total of EPDM and PP.

EXAMPLES 10 - 11 AND COMPARATIVE EXAMPLE 8

The compositions shown in Table 4 were prepared by the following procedure.

In a B type Banbury mixer preliminarily heated to a temperature of about 100° C, the whole quantities of the components listed in Table 4 were blended, except that the 1,2-PBD was blended in a half amount. PO and SS were successively added in the same manner as in Examples 6 - 9. After the reaction was stopped, the residual 1,2-PBD was added to obtain intended compositions. Specimens for use in the tests were prepared in the same manner as in Examples 6 - 9. This procedure is referred to hereinafter as "1,2-PBD portionwise addition method."

As mentioned above, it was difficult to obtain a composition having a 1,2-PBD content of more than about 25% by weight, so far as the procedures of Examples 6 - 9 or Comparative Examples 6 - 7 were employed. On the contrary, it was possible to obtain a composition having well balanced physical properties when the above-mentioned 1,2-PBD portionwise addition method (a method by which a part of 1,2-PBD is added, partially crosslinked, and thereafter the residual 1,2-PBD was added) was employed. When the 1,2-PBD content exceeded 50% by weight, however, the composition obtained was quite poor in fluidity, low in mechanical strength and unsatisfactory in compression set (Comparative Example 8).

FIGS. 1 and 2 illustrate, respectively, the dependences of tensile strength and compression set upon the 1,2-PBD content, provided that the ratio of EPDM to PP was kept constant. The data of FIGS. 1 and 2 evidently demonstrate the essential necessity of 1,2-PBD for obtaining a good balance of physical properties between mechanical strengths and compression set or the like. As seen, however, too large a quantity of 1,2-PBD is undesirable from the viewpoint of balance of physical properties. The appropriate range of 1,2-PBD content is as defined in the claims.

Table 4

|  |  | Example | | Comparative Example |
|---|---|---|---|---|
|  |  | 10 | 11 | 8 |
| 1,2-PBD-I | (% by weight) | 20 | 40 | 60 |
| EPDM | (% by weight) | 56 | 42 | 28 |
| PP | (% by weight) | 24 | 18 | 12 |
| PO-III | (PHR) | 1.5 | 1.5 | 1.5 |
| SS | (PHR) | 1.0 | 1.0 | 1.0 |
| Tetralin-soluble fraction | (% by weight) | 78 | 56 | 51 |

Table 4-continued

|  |  | Example | | Comparative Example |
|---|---|---|---|---|
|  |  | 10 | 11 | 8 |
| Proportions of Tetralin-soluble fractions |  |  |  |  |
| 1,2-PBD-I | (% by weight) | 81 | 53 | 40 |
| EPDM | (% by weight) | 73 | 47 | 57 |
| PP | (% by weight) | 92 | 82 | 89 |
| Fluidity (cc/sec) × $10^3$ |  |  |  |  |
| under 30 kg load at 180° C |  | — | — | 0 |
| under 30 kg load at 200° C |  | 9.9 | 1.3 | 0 |
| Tensile strength (kg/cm$^2$) |  | 118 | 104 | 85 |
| Elongation (%) |  | 230 | 150 | 260 |
| Hardness (Shore D) |  | 46 | 42 | 37 |
| Permanent elongation (%) |  | 26 | 24 | 22 |
| Compression set, 70° C × 22 hours (%) |  | 44 | 48 | 63 |

Note: PHR means parts by weight per hundred parts by weight of the total of 1,2-PBD, EPDM and PP.

EXAMPLE 12 AND COMPARATIVE EXAMPLES 9 - 10

In Table 5, there are shown the characteristics of the composition of this invention and those of a composition in which either of EPDM or 1,2-PBD is uncrosslinked.

As is clear from Table 5, the composition of this invention is greatly improved in tensile strength and compression set as compared with the composition in which either of EPDM or 1,2-PBD is uncrosslinked (Comparative Examples 9 to 10), and is also improved in weather resistance as compared with the composition in which the 1,2-PBD is 100% uncrosslinked.

Table 5

|  |  | Example | Comparative Example | |
|---|---|---|---|---|
|  |  | 12 | 9 | 10 |
| 1,2-PBD-I | (% by weight) | 33.4 | 33.4 | 33.4 |
| EPDM | (% by weight) | 33.3 | 33.3 | 33.3 |
| PP | (% by weight) | 33.3 | 33.3 | 33.3 |
| PO-I | (PHR) | 1.5 | 1.5 | 1.5 |
| SS | (PHR) | 1.0 | 1.0 | 1.0 |
| Tetralin-soluble fraction | (% by weight) | 50 | 63 | 62 |
| Proportions of Tetralin-soluble fractions |  |  |  |  |
| 1,2-PBD-I | (% by weight) | 46 | 100 | 38 |
| EPDM | (% by weight) | 32 | 31 | 100 |
| PP | (% by weight) | 72 | 88 | 76 |
| Tensile strength (kg/cm$^2$) |  | 141 | 97 | 99 |
| Elongation (%) |  | 150 | 360 | 150 |
| Hardness (Shore D) |  | 56 | 53 | 54 |
| Residual strain at break (%) |  | 25 | 116 | 32 |
| Elongation/residual strain ratio |  | 6.0 | 3.1 | 4.7 |
| Compression set (%) |  |  |  |  |
| 25° C × 22 hrs. |  | 43 | 48 | 45 |

Table 5-continued

|  | Example 12 | Comparative Example 9 | Comparative Example 10 |
|---|---|---|---|
| 70° C × 22 hrs. | 61 | 87 | 82 |
| Vicat softening point (° C) | 104 | 77 | 79 |
| Weather resistance (percentage change after 96 hrs.) | | | |
| Tensile strength | 5 | −12 | 4 |
| Elongation | −30 | −81 | −30 |

Note: PHR means parts by weight per hundred parts by weight of the total of 1,2-PBD, EPDM and PP.

EXAMPLES 13 – 15

The compositions shown in Table 6 were prepared by the following procedure.

In a B type Banbury mixer preliminarily heated to a temperature of about 100° C, the whole quantities of the components listed in Table 6 were blended together with CB or OIL. When PP had melted, PO was added and allowed to react with the components for several minutes. Subsequently, the reaction was stopped by adding SS.

Specimens for use in the tests were prepared in the same manner as in Example 1.

Table 6

|  |  | Example 13 | Example 14 | Example 15 |
|---|---|---|---|---|
| 1,2-PBD-I | (% by weight) | 10 | 10 | 9.1 |
| EPDM | (% by weight) | 60 | 60 | 72.7 |
| PP | (% by weight) | 30 | 30 | 18.2 |
| PO-II | (PHR) | 1.5 | 1.5 | — |
| PO-III | (PHR) | — | — | 1.5 |
| SS | (PHR) | 1.0 | 1.0 | 1.0 |
| CB | (PHR) | 5 | 15 | — |
| OIL | (PHR) | — | — | 10 |
| Tetralin-soluble fraction | (% by weight) | 71 | 68 | 62 |
| Proportions of Tetralin-soluble fractions | | | | |
| 1,2-PBD-I | (% by weight) | 75 | 72 | 70 |
| EPDM | (% by weight) | 60 | 56 | 59 |
| PP | (% by weight) | 91 | 92 | 90 |
| Fluidity at 200° C under a load of 30 kg (cc/sec) × 10$^3$ | | 6.8 | 6.6 | 4.5 |
| Tensile strength (kg/cm$^2$) | | 123 | 129 | 90 |
| Elongation (%) | | 240 | 230 | 250 |
| Hardness (Shore D) | | 42 | 44 | 30 |
| Permanent elongation (%) | | 31 | 30 | 16 |
| Compression set, 70° C × 22 hrs. (%) | | 50 | 50 | 33 |
| Tear strength (kg/cm) | | 62 | 65 | — |

Note: PHR means parts by weight per hundred parts by weight of the total of 1,2-PBD, EPDM and PP.

What is claimed is:

1. A thermoplastic elastomer composition consisting essentially of (A) 2 to 50% by weight of a polybutadiene having a 1,2-addition unit content of 70% or more and an intrinsic viscosity [η] of 0.7 dl/g or more as measured in toluene at 30° C, (B) 20 to 90% by weight of at least one olefinic rubber selected from the group consisting of random ethylene-propylene copolymer and random ethylene-propylene-non-conjugated diene copolymer and (C) 5 to 60% by weight of a polyolefin resin, 30 to 95% by weight of the total polymer components, up to 90% by weight of said polybutadiene and up to 90% by weight of said olefinic rubber being soluble in 1,2,3,4-tetrahydronaphthalene when the composition is heated at 210° C for 3 hours in 1,2,3,4-tetrahydronaphthalene under reflux.

2. The composition according to claim 1, wherein the polybutadiene has a 1,2-addition unit content of 85% or more.

3. The composition according to claim 1, wherein the polybutadiene has a crystallinity of 5% to 50%.

4. The composition according to claim 1, wherein the polybutadiene has a crystallinity of 10% to 30%.

5. The composition according to claim 1, wherein the proportion of the polybutadiene is in the range of 5% to 45% by weight.

6. The composition according to claim 3, wherein the proportion of the olefinic rubber is in the range of 30% to 85% by weight.

7. The composition according to claim 1, wherein the polyolefin resin is a poly-α-olefin resin or an olefin copolymer resin.

8. The composition according to claim 1, wherein the polyolefin resin is polyethylene, polypropylene, polybutene, polypentene or crystalline ethylene-propylene block copolymer.

9. The composition according to claim 1, wherein the polyolefin resin is polyethylene or polypropylene.

10. The composition according to claim 6, wherein the proportion of the polyolefin resin is in the range of 10% to 40% by weight.

11. The composition according to claim 1, wherein 40 to 95% by weight of the total polymer components is soluble in 1,2,3,4-tetrahydronaphthalene when the composition is heated at 210° C for 3 hours in 1,2,3,4-tetrahydronaphthalene under reflux.

12. The composition according to claim 1, wherein the composition is prepared by blending a part of the (A) component with the (B) and (C) components, partially crosslinking the resulting mixture, and thereafter incorporating the residual (A) component into the crosslinked mixture.

13. The composition according to claim 1, wherein the (A) component is a polybutadiene having a 1,2-addition unit content of 85% or more, a crystallinity of 5% to 50%, and an intrinsic viscosity of at least 0.7 dl/g as measured in toluene at 30° C, the (B) component is a random ethylene-propylene-non-conjugated diene copolymer, and the (C) component is polypropylene.

* * * * *